Patented Sept. 4, 1945

2,383,937

UNITED STATES PATENT OFFICE 2,383,937

COMPOSITION FOR PRINTING FLEXIBLE MATERIALS

Roy Herman Kienle, Bound Brook, and Alfred Louis Peiker, East Bound Brook, N. J., assignors to American Cyanamid Company, New York, N. Y., a corporation of Maine No Drawing. Application February 21, 1941, Serial No. 379,998

10 Claims. (Cl. 260—13)

This invention relates to compositions for printing and coloring flexible materials, for example fibers, fabrics, and the like.

According to the present invention we have found that if emulsions of the water-in-oil type are prepared incorporating rubber or similar elastomers, it is possible to cause sufficient flow to give uniform blotch printing without destroying the sharpness of print outline, and thus shallow engravings can be employed and an excellent hand imparted to the printed fabric. Not only does this make it possible to print more satisfactorily certain designs which are of the blotch type, but the added slight flow characteristics and increased film flexibility of the emulsions printed according to the present invention permits the use of such emulsions for printing different types of designs at the same time from the same roll. This added flexibility in use is an advantage as it obviates the necessity in some cases of multiple printing where the color is the same but where the different parts of the design require emulsions of different characteristics.

It is an advantage of the present invention that the incorporation of elastomers into the composition does not alter either the technique of producing the emulsions or of applying them. In fact the emulsions are materially improved especially in regard to flow and stability. The present invention can therefore be practiced by those familiar with lacquer emulsion printing without the necessity of further experimentation or the acquiring of any new technique.

The present invention depends broadly on the incorporation of natural and synthetic elastomers in pigmented lacquer emulsions. The usual procedures in forming these emulsions are, of course, followed.

Although not broadly limited to emulsions formed by known methods, the present invention is peculiarly adapted to such procedures because it is possible to incorporate the elastomer either in the paste itself or in a non-colored aqueous emulsion which can be used as a thinner or reducer in order to obtain shades of different densities. The fact that the elastomers, which form the essential feature of the present invention, can be incorporated either in the paste, in a suitable reduction emulsion, or both, is an added advantage of the present invention and makes the present invention applicable to a very wide field permitting an extremely diversified use by the printer or colorist.

The present invention is not broadly concerned with the particular organic solvents used and in general any suitable solvents can be employed and will be chosen in accordance with the particular film-forming substance or substances used. We have found that in many cases brighter and stronger results are obtained when solvents are used which are predominantly non-aromatic in character and such solvents form a preferred embodiment when associated with the elastomers of the present invention. It should be understood, however, that we do not claim in this application the use of such solvents per se as this forms the subject matter of the copending application of Peiker and Kienle, Serial No. 373,796, filed January 9, 1941.

The range of pigments and of film-forming ingredients is not affected by the present invention. In general we prefer to use film-forming substances which are capable of curing or setting to an insoluble substance by heat or oxidation. The various thermo-setting or air-drying synthetic resins are therefore preferred and produce prints of the highest degree of permanence. The invention, however, is also applicable to emulsions prepared with other film-forming substances where the particular properties of the thermo-setting resin is not desired. In most cases, however, it will be found that typical thermo-setting or oxidizing resins such as alkylated amino plastics, drying oil acid modified alkyd resins, and the like, will give the most satisfactory printing compositions.

It is normally desirable to employ emulsifying agents which may be incorporated in the paste if this method of emulsion formation is used, or may be present in a reducing emulsion, or the like. The range of emulsifying agents is very broad. In general, any emulsifying agent which is suitable for the production of water-in-oil emulsions may be employed such as, for example, low concentrations of ammonium or amine soaps of fatty acids.

Emulsions of the present invention essentially contain as their oil phase a pigmented dispersion of film-forming material in organic solvents. It is not necessary that this phase be a true lacquer, that is to say, a solution of the film-forming substance in the organic solvent. On the contrary, the dispersion may be non-homogeneous although of course the non-homogeneity should be fine-grained. Not only is it possible to have the oil phase non-homogeneous, that is to say, with part of the film-forming materials present as solid particles or particles of gelatinized solid dispersed throughout the oil phase, but there is actually, in many cases an advantage as we have found that with many emulsions the prints are stronger and brighter if the oil phase is not a perfect solution. We do not pretend to know the reason for this rather anomalous behavior and it is not intended to limit this portion of the invention to any theory of action.

The invention will be described in greater detail in conjunction with the following specific examples in which the parts are by weight.

*Example 1*

33 parts of a polymer of chloroprene are dissolved in 157 parts of toluene. This solution is mixed by means of a high speed stirrer with 12 parts of copper phthalocyanine dispersed in 12 parts of diethanolamine oleate and 94 parts of water. The resulting mixture is homogenized by continued high speed stirring followed by a passage through a colloid mill. This procedure results in a water-in-oil type of emulsion. 150 parts of this emulsion are then diluted, using high speed agitation, with 75 parts of toluene. A uniform blue colored emulsion results which pours easily, possesses an aqueous dispersed phase with all particles of the dispersed phase 5 microns or smaller, and is of good printing viscosity. This emulsion is now placed in the paste well of a print machine and applied to an engraved copper roll. Cotton fabric is then passed over the engraved roll and the clear, strong, blue prints obtained have an excellent hand. These cotton prints are dried one-half hour at a temperature of approximately 50° C. and heat-treated for 5 minutes at a temperature of 120° C. The resulting prints are resistant to both wet and dry crocking and show remarkable washfastness to test No. 4 of the American Association of Textile Colorists and Chemists Year Book of 1939 (A. A. T. C. C.)

*Example 2*

637 parts by weight of a mixture of polymers, the composition of which follows: 185 parts of a solution of low viscosity ethyl cellulose, consisting of 134 parts of ethyl cellulose in 360 parts of a petroleum fraction boiling between 135° and 175° C. and with an aromatic hydrocarbon content of about 90%, is mixed with 418 parts of a 60% solution of a fatty acid modified alkyd resin having an oil length of 50 in the solvent just described, are mixed with 30 parts by weight of tricresyl phosphate,
120 parts by weight of a blue pigment, copper phthalocyanine, and
60 parts by weight of an inert white pigment with little or no covering or hiding power, commonly known as an extender, and the entire mass ground together on a three-roller ink mill until a fine and uniform dispersion is obtained. This pigmented material is then blended with
277 parts by weight of a 50% solution of a butylated dimethylol urea in a mixture of xylene and butanol, and
526 parts by weight of the petroleum solvent described earlier in this example.

A printing paste is then made from the pigmented base described above, by blending 110 parts by weight of the pigmented base with 40 parts of a 20%, by weight, solution of chloroprene in the petroleum fraction described earlier, 20 parts by weight of turpentine and 30 parts by weight of the petroleum fraction described in the preceding paragraphs.

The printing paste just described can be printed as prepared but the usual practice is to reduce the strength of this paste by mixing therewith the required quantity of a so-called reducing emulsion. As for example in the preparation of a six "light" printing paste, 10 parts of the concentrated printing paste described in the previous paragraph are intimately mixed with 60 parts of a reducing emulsion. The reducing emulsion is prepared as follows:

The first step is the preparation of a so-called reduction concentrate and involves thoroughly homogenizing the following ingredients:

50 parts of a 60% solution of a heat-converting, fatty acid modified alkyd resin in a petroleum solvent with a boiling range of 135–175° C., and containing at least 90% aromatic hydrocarbons, 40 parts of a 10% solution of milled rubber in the same solvent, 22.2 parts of a 27% ethyl cellulose solution in the solvent just described, 10 parts of steam distilled pine oil, 3.8 parts of the solvent containing at least 90% aromatic hydrocarbons, 10 parts of sodium lignin sulfonate, 6 parts of 85% ortho phosphoric acid, and 58 parts of water.

The second step, or the preparation of the reducing emulsion proper, is conducted as follows:

25 parts of the reduction concentrate described in the preceding paragraph, 40 parts of the 10% milled rubber solution described above, 20 parts of turpentine, 10 parts of steam distilled pine oil, 240 parts of a solvent whose boiling range is between 135–175° C. and which contains 90–95% of aromatic hydrocarbons, 640 parts of water and 20 parts of glacial acetic acid are intimately mixed with a homogenizing stirrer until a creamy water-in-oil type of emulsion is obtained.

The printing pastes just described produce clean, sharply defined, bright greenish-blue patterns or designs on cellulosic fabrics when applied thereon from engraved copper rolls. These prints, when dried and subjected to a heat treatment of 1 minute at 120° C. possess excellent washfastness and a good hand.

*Example 3*

A series of printing pastes is made up in the following manner:

A. Preparation of a six "light" color paste:

40 parts of the blue pigmented base described in detail in Example 2 are thoroughly mixed with
100 parts of a polymeric chloroprene solution whose composition follows:
320 parts of a 10% solution of polymeric chloroprene in a petroleum fraction with a boiling range of 135–175° C. and which contains about 90% aromatic hydrocarbons, 160 parts of turpentine and 1520 parts of the petroleum solvent described above. Then
134 parts of water, and
5.6 parts of glacial acetic acid are added slowly while the mixture is being vigorously stirred with a homogenizing type of stirrer. This results in a smooth emulsion that prints well on fabrics.

B. Preparation of a twelve "light" color paste:

This printing paste is made in a similar manner but the ingredients used follow:

70 parts of the six "light" color paste,
15 parts of the chloroprene solution described above,
45 parts of water and
2.6 parts of glacial acetic acid.

C. Preparation of a twenty "light" color paste:

The procedure used is similar to that described above with the ingredients being:

40 parts of the six "light" color paste
20 parts of the chloroprene solution described above
60 parts of water, and
2.4 parts of glacial acetic acid.

D. Preparation of a forty "light" color paste:

The procedure used is similar to that described above with the ingredients being:

20 parts of the six "light" color paste
25 parts of the chloroprene solution
75 parts of water, and
2.4 parts of glacial acetic acid.

These smooth printing pastes are then printed from an engraved copper roll on fabrics. The prints obtained are clean, sharp, bright greenish blue patterns, which, after drying followed by a heat treatment of 1 minute at 120° C. possess excellent fastness to washing. The hand of these printed fabrics is very good.

*Example 4*

A violet pigmented base is made as follows:

1105 parts of the mixture of polymers described in Example 2 are mixed with:
220 parts of Vat Violet (C. I. 3231), and
110 parts of a white pigment with very little or no covering power, such as aluminum hydrate, and the entire mass intimately ground together by several passes over a three-roller mill, when
430 parts of a petroleum fraction with a boiling range of 135–175° C. and with an aromatic hydrocarbon content of about 90%. This smooth rather viscous reddish violet pigmented base is made into a thinner paste in the following manner:
932.5 parts of the violet pigmented base just described are mixed with:
27.5 parts of tricresyl phosphate
160.0 parts of a solution of a butylated dimethylol urea in equal parts of butanol and xylene
400.0 parts of a 10% solution of milled rubber in the petroleum solvent described earlier in this example
280.0 parts of the same petroleum solvent, and
200.0 parts of turpentine, and the ingredients stirred together until a very smooth, highly colored paste is obtained. This violet colored paste can be printed on textiles as is, or reduced in a manner similar to that described in detail in Example 2. The reddish violet patterns thus obtained are clean, sharp, and bright, and possess good fastness properties.

*Example 5*

637 parts of a mixture of polymers is prepared by blending the following ingredients:

185 parts of low viscosity ethyl cellulose solution consisting of 134 parts of ethyl cellulose dissolved in 288 parts of a petroleum fraction with a boiling range of 160–250° C. predominantly paraffinic and naphthenic in nature with less than 20% aromatic hydrocarbons and 72 parts of butanol, and 418 parts of a solution of an alkyd resin prepared by dissolving 300 parts of a heat converting fatty acid modified alkyd having an oil length of 50 in 160 parts of the petroleum solvent described above and 40 parts of butanol. This blend of polymers is mixed with 120 parts of copper phthalocyanine (a blue pigment) and 60 parts of an inert white pigment with little or no hiding or covering power, then the mixture is ground together on a grinding tool, such as a 3-roller ink mill to insure fine and uniform pigmentation. The milled pigmented base is then blended with 30 parts of tricresyl phosphate, 277 parts of a 50% solution of butylated dimethylol urea in equal parts of butanol and xylene, 263 parts of the petroleum solvents described previously in this example and 263 parts of a solvent whose boiling range is 135–175° C. and whose aromatic hydrocarbon content is at least 90%.

This pigmented base is then made into a water-in-oil emulsion suitable for printing from an engraved copper roller in the following manner:

40 parts of the pigmented base is thoroughly mixed with 100 parts of a milled rubber solution whose composition follows:

300 parts of a milled rubber solution containing 32 parts of milled rubber and 288 parts of a hydrocarbon solvent having a boiling range of 135–175° C. and an aromatic content of at least 90%, 165 parts of turpentine, and 1520 parts of a petroleum solvent whose boiling range is 150–207° C. and which contains less than 25% aromatic hydrocarbons. To the mixture of pigmented base and rubber solution described above, a dilute acetic acid solution composed of 5.6 parts of glacial acetic acid dissolved in 134.4 parts of water is added very slowly while the mixture is undergoing vigorous and intimate stirring. This mixture gives a so-called six "light" printing paste. Other strength printing pastes are prepared in much the same manner except that the quantities of base, rubber solution, water and acetic acid must be varied in order to produce the desired viscosity as well as the desired strength prints (as per Example 3).

When the reduced color pastes are printed on cotton or other cellulosic fabrics from an engraved copper roller, clean, bright, greenish-blue prints are obtained which have a good hand and good fastness properties.

*Example 6*

A smooth blue-colored water-in-oil emulsion is prepared in the following manner:

A pigmented base is prepared first by mixing 766 parts of a 60% alkyd resin solution made by dissolving a fatty acid modified alkyd resin with an oil length of 50 in a petroleum fraction with a boiling range of 135–175° C. and with an aromatic hydrocarbon content of 90%, with 160 parts of a blue pigment (copper phthalocyanine) and 80 parts of the inert white pigment described in the preceding examples and the pigment dispersed therein by grinding on a three roller mill. This pigmented alkyd solution is then blended with 480 parts of the butylated dimethylol urea solution described in the previous examples and 1768 parts of the 10% milled rubber solution described in the previous examples. This base is then made into a water-in-oil emulsion by slowly adding 745 parts of water thereto while the entire mass is being stirred with a homogenizing type stirrer.

The emulsion thus prepared may be printed full strength but the usual practice is to reduce the color strength in a manner similar to that described in Example 2.

The prints obtained when these emulsions are applied to cotton or cellulosic fabrics from an engraved roll have good fastness properties and possess a good hand.

Example 7

167.5 parts of the mixture of polymers described in Example 5 is mixed with 24 parts of a green pigment, chlorinated phthalocyanine, and 12 parts of the inert white pigment described in earlier examples and the mixture ground on a tool such as a three roller mill until a fine and uniform dispersion is obtained. This mixture is then blended with 61 parts of the butylated dimethylol urea described in previous examples. This results in a smooth, green pigmented base.

This base is then made into a water-in-oil emulsion in the following manner:

88 parts of the pigmented base is thoroughly mixed with 40 parts of a 10% solution of medium viscosity polymerized isobutylene (M. W. about 100,000) and a solution consisting of one part of a morpholine oleate dissolved in 12.5 parts of a petroleum solvent with a boiling range of 160–250° C. containing about 16% aromatic hydrocarbons, the remainder being paraffinic and/or naphthenic hydrocarbons. When this mixture is smooth, 58.5 parts of water is slowly added under constant and intimate stirring with a homogenizing type of stirrer. A smooth, green water-in-oil emulsion results.

This emulsion is reduced to the desired strength in a manner similar to that described in previous examples and the reduced color emulsions are printed on cotton to produce clean, bright green patterns with a good hand and good fastness properties.

The invention has been described in the examples in greater detail in conjunction with printing which is a very important field of application. However, it should be understood that the products of the present invention are applicable generally for coloring materials regardless of whether they are applied in the form of printed designs. The advantage of other procedures of dyeing is not as great as in printing but it should be understood that the invention is not limited to the application of printed designs, the compositions being suitable for coloring in solid colors also.

We claim:

1. A colored emulsion, capable of coloring flexible materials such as fabrics and fibers, which comprises a water-in-oil type of emulsion, the oil phase of which comprises at least one organic solvent containing therein at least one water-insoluble, organic, film-forming, thermo-setting material, soluble in said solvent and capable of rapid setting at moderate temperatures, together with at least one elastomer; the amount of thermosetting material being sufficient to produce an emulsion of printable consistency but insufficient to materially stiffen textile fabrics colored with the emusion and insufficient to cause adhesion to the application machinery.

2. A composition according to claim 1, containing in the oil phase a dispersed cellulose ether.

3. A colored emulsion, capable of coloring flexible materials such as fabrics and fibers, which comprises a water-in-oil type of emulsion, the oil phase of which comprises at least one organic solvent containing therein at least one water-insoluble alkyd resin, soluble in said solvent and capable of rapid setting at moderate temperatures, together with at least one elastomer; the amount of alkyd resin being sufficient to produce an emulsion of printable consistency but insufficient to materially stiffen textile fabrics colored with the emulsion and insufficient to cause adhesion to the application machinery.

4. A colored emulsion, capable of coloring flexible materials such as fabrics and fibers, which comprises a water-in-oil type of emulsion, the oil phase of which comprises at least one organic solvent containing therein at least one water-insoluble amino plastic, soluble in said solvent and capable of rapid setting at moderate temperatures, together with at least one elastomer; the amount of amino plastic being sufficient to produce an emulsion of printable consistency but insufficient to materially stiffen textile fabrics colored with the emulsion and insufficient to cause adhesion to the application machinery.

5. A colored emulsion, capable of coloring flexible materials such as fabrics and fibers, which comprises a water-in-oil type of emulsion, the oil phase of which comprises at least one organic solvent containing therein at least one urea-formaldehyde resin, soluble in said solvent and capable of rapid setting at moderate temperatures, together with at least one elastomer; the amount of urea-formaldehyde resin being sufficient to produce an emulsion of printable consistency but insufficient to materially stiffen textile fabrics colored with the emulsion and insufficient to cause adhesion to the application machinery.

6. A base capable of emulsification with aqueous media to form a stable, water-in-oil emulsion comprising at least one organic solvent containing therein coloring material, at least one water-insoluble, organic, film-forming, thermosetting substance, soluble in said solvent and capable of rapid setting at moderate temperatures and at least one elastomer; the amount of thermosetting substance present being sufficient so that the base, on emulsification, produces an emulsion of printable consistency but insufficient to produce, on emulsification, an emulsion which will materially stiffen fabrics colored therewith or adhere to the application machinery.

7. A base according to claim 6 containing a dispersed cellulose ether.

8. A base capable of emulsification with aqueous media to form a stable, water-in-oil emulsion comprising at least one organic solvent containing coloring material and at least one water-insoluble alkyd resin, soluble in said solvent and capable of rapid setting at moderate temperatures, together with at least one elastomer; the amount of alkyd resin present being sufficient so that the base, on emulsification, produces an emulsion of printable consistency but insufficient to produce, on emulsification, an emulsion which will materially stiffen fabrics colored therewith or adhere to the application machinery.

9. A base capable of emulsification with aqueous media to form a stable, water-in-oil emulsion comprising at least one organic solvent having dispersed therein coloring material, at least one water-insoluble amino plastic, soluble in said solvent and capable of rapid setting at moderate temperatures, together with at least one elastomer; the amount of amino plastic present being sufficient so that the base, on emulsification, produces an emulsion of printable consistency but insufficient to produce, on emulsification, an emulsion which will materially stiffen fabrics colored therewith or adhere to the application machinery.

10. A base capable of emulsification with aqueous media to form a stable, water-in-oil emulsion comprising at least one organic solvent having dispersed therein coloring material, at least one water-insoluble urea-formaldehyde resin, soluble in said solvent and capable of rapid setting at moderate temperatures, together with at least one elastomer; the amount of urea-formaldehyde resin present being sufficient so that the base, on emulsification, produces an emulsion of printable consistency but insufficient to produce, on emulsification, an emulsion which will materially stiffen fabrics colored therewith or adhere to the application machinery.

ROY HERMAN KIENLE.
ALFRED LOUIS PEIKER.